United States Patent
Salciarini et al.

(10) Patent No.: US 11,267,198 B2
(45) Date of Patent: Mar. 8, 2022

(54) METHOD FOR MANUFACTURING A COSMETIC PRODUCT APPLICATOR BY ADDITIVE MANUFACTURING

(71) Applicant: CHANEL PARFUMS BEAUTE, Neuilly-sur-Seine (FR)

(72) Inventors: Christian Salciarini, Hyeres (FR); Quentin Bertucchi, Asnieres sur Seine (FR)

(73) Assignee: CHANEL PARFUMS BEAUTE, Neuilly-sur-Seine (FR)

( * ) Notice: Subject to any disclaimer, the term of this patent is extended or adjusted under 35 U.S.C. 154(b) by 92 days.

(21) Appl. No.: 16/962,148

(22) PCT Filed: Jan. 8, 2019

(86) PCT No.: PCT/FR2019/050031
§ 371 (c)(1),
(2) Date: Jul. 14, 2020

(87) PCT Pub. No.: WO2019/138180
PCT Pub. Date: Jul. 18, 2019

(65) Prior Publication Data
US 2020/0406536 A1 Dec. 31, 2020

(30) Foreign Application Priority Data
Jan. 15, 2018 (FR) ...................................... 1850296

(51) Int. Cl.
*B29C 64/153* (2017.01)
*B33Y 10/00* (2015.01)
(Continued)

(52) U.S. Cl.
CPC ............ *B29C 64/153* (2017.08); *A46B 9/021* (2013.01); *A46D 1/0207* (2013.01); *A46D 1/045* (2013.01);
(Continued)

(58) Field of Classification Search
CPC ... B29C 64/153; B29C 64/165; B29C 64/188; B29C 64/35; B29C 64/357; B29C 64/364; B33Y 80/00; B33Y 30/00
See application file for complete search history.

(56) References Cited

U.S. PATENT DOCUMENTS 4,861,663 A * 8/1989 Sirinyan .................. C08J 7/043
428/409
7,285,234 B2 10/2007 Pfeifer et al.
2006/0251826 A1 11/2006 Pfeifer et al.

FOREIGN PATENT DOCUMENTS

WO      2011/145960 A1    11/2011

OTHER PUBLICATIONS

International Search Report issued in International Patent Application No. PCT/FR2019/050031, dated Apr. 26, 2019, along with an English translation thereof.

* cited by examiner

*Primary Examiner* — Nahida Sultana
(74) *Attorney, Agent, or Firm* — Greenblum & Bernstein, P.L.C.

(57) ABSTRACT

A method for manufacturing a cosmetic product applicator including a gripping part and an applicator part having bristles or teeth. The method includes additive manufacturing (S1) by sintering a powder of a plastics material followed by depowdering (S2) and post-treatment for the removal of particles that have become detached from the cosmetic product applicator or are partially sintered, the post-treatment including blasting (S4) and ionizing blowing (S5). This method allows the removal of particles likely to be irritating, for example with a size greater than 500 micrometers, while being suitable for industrial production. The invention also relates to an associated production method.

15 Claims, 2 Drawing Sheets

(51) Int. Cl.
| | |
|---|---|
| *B33Y 80/00* | (2015.01) |
| *B29C 64/357* | (2017.01) |
| *B29C 64/35* | (2017.01) |
| *B33Y 40/20* | (2020.01) |
| *B33Y 40/10* | (2020.01) |
| *A46B 9/02* | (2006.01) |
| *A46D 1/00* | (2006.01) |
| *A46D 1/045* | (2006.01) |
| *A46D 3/00* | (2006.01) |
| *B08B 3/08* | (2006.01) |
| *B29C 71/00* | (2006.01) |
| *B29K 77/00* | (2006.01) |
| *B29L 31/00* | (2006.01) |

(52) U.S. Cl.
CPC .................. *A46D 3/00* (2013.01); *B08B 3/08* (2013.01); *B29C 64/35* (2017.08); *B29C 64/357* (2017.08); *B29C 71/0081* (2013.01); *B33Y 10/00* (2014.12); *B33Y 40/10* (2020.01); *B33Y 40/20* (2020.01); *B33Y 80/00* (2014.12); *A46B 2200/1053* (2013.01); *B29K 2077/00* (2013.01); *B29L 2031/718* (2013.01)

METHOD FOR MANUFACTURING A COSMETIC PRODUCT APPLICATOR BY ADDITIVE MANUFACTURING

BACKGROUND

1. Field of the Invention

The present invention concerns the field of the industrial methods for obtaining applicators for a cosmetic product.

The application of a cosmetic product in liquid, fluid or powder form is generally carried out using an applicator comprising bristles or teeth making it possible to retain the cosmetic product like the bristles of a paintbrush.

Although the invention is described in the context of the application of a mascara, cosmetic products in the present document encompass all make-up products for the skin, the lips or the superficial appendages. cosmetic products also encompass care products, in particular liquid care formulas, provided for application to the skin, the lips and the superficial appendages. The invention is of particular interest in the context of the application of cosmetic products near the eyes, in particular on the eyelashes or the eyelids For example, the cosmetic product may be mascara, eye shadow, or eye contour makeup commonly referred to as "eyeliner".

2. Description of the Background

An item of mascara, or "mascara", conventionally comprises a case, a mascara reservoir and an applicator. Several types of applicator exist, those of "bottle brush" type, those that are injection molded and those produced by additive manufacturing (sometimes called "additive manufacture"). Additive manufacturing designates the methods of manufacturing by addition or aggregation of matter, also commonly designated by the expression "three-dimensional printing" or "3D printing".

An applicator of bottle brush type comprises a brush which has bristles formed by fibers trapped in a twisted metal wire forming the core of the applicator.

An injection-molded applicator is generally formed of one piece and comprises bristles or teeth of plastic material for example.

An applicator manufactured by additive manufacturing is also generally of one piece and can be formed for example from a powder of thermoplastic polymers.

The conventional methods of obtaining a part by additive manufacturing enable parts to be obtained having very precise dimensional features. Nevertheless, the cosmetic product applicators obtained may present certain defects or drawbacks. In particular, these applicators may have roughness that is badly controlled, unsatisfactory or irregular, in particular at the location of the application bristles or teeth. Moreover, these applicators may have particles that are detached or liable to detach when application is carried out. This alters the quality of the application and may prove problematic in particular on application of a cosmetic product near the eyes, for example on the eyelids. In particular, particles having a certain size may be an irritant for the cornea.

Lastly, the current methods are poorly adapted to mass production.

SUMMARY

The invention is thus directed to providing a method of manufacturing an applicator for a cosmetic product solving at least one of the aforementioned drawbacks.

The invention thus relates to a method of manufacturing a cosmetic product applicator comprising a grip part and an application part comprising bristles or teeth, the grip part and the application part being formed as one piece. The method comprises additive manufacturing by sintering of a powder of plastic material followed by depowdering and a post-treatment for the elimination of the particles that are detached from said cosmetic product applicator or are partially sintered. The post-treatment comprises sand-blasting (S4) and ionizing blowing (S5).

The method of manufacturing a cosmetic product applicator is thus envisioned according to the invention as a set of steps (i.e., "method parts") of which the succession makes it possible to obtain desired properties for the applicator. In particular, the set of steps of the claimed method is necessary for obtaining a desired roughness at the location of the application part (comprising bristles, or teeth) of the applicator, while guaranteeing the absence of particles potentially irritant (for example for the user's eye) that are detached or that may detach on use of the applicator.

The post-treatment may further comprise a final step of washing (S6), preferably in a non-aqueous solvent.

The plastic material employed in the manufacturing method may be a polyamide, preferably an aliphatic polyamide, for example polyamide 11.

The manufacturing method may comprise, prior to the additive manufacturing, a processing of the polyamide powder comprising:
  providing new powder having only grains of which the greatest dimension is less than or equal to 150 microns;
  providing so-called used powder, having already served for additive manufacturing, and the calibration of said used powder in order for it to have only grains of which the greatest dimension is less than or equal to 150 microns;
  mixing the new powder and the calibrated used powder in a new powder/used powder ratio comprised between 70/30 and 50/50, preferably of the order of 60/40.

The additive manufacturing may comprise powder bed fusion by laser.

The manufacturing method may comprise pre-blowing prior to the sand-blasting. The sand-blasting may be carried out by microsphere treatment with glass spheres of diameter comprised between 45 microns and 90 microns. The sand-blasting may be carried out in a rotary drum comprising two sand-blasting nozzles.

The ionizing blowing (S5) may be carried out in a rotary drum comprising an internal ionizing bar and an external ionizing bar.

The sand-blasting (S4) and ionizing blowing (S5) may for example be carried out in batches of 300 to 10 000 cosmetic product applicators.

The invention also relates to a method of producing cosmetic product applicators comprising a manufacturing method as described earlier, and further comprising qualifying (S7) comprising determining, in a batch of a predetermined number of cosmetic product applicators, the number of residual particles that are detached or partially sintered of largest dimension greater than 500 microns, and, if said number particles is not zero, modifying at least one parameter of post-treatment, then the succession of such manufacturing methods and qualifying steps (S7) until said number of particles of largest dimension greater than 500 microns is zero.

Still other particularities and advantages of the invention will appear in the following description.

BRIEF DESCRIPTION OF THE DRAWINGS

In the accompanying drawings, given by way of non-limiting examples.

DETAILED DESCRIPTION

Figure 1:
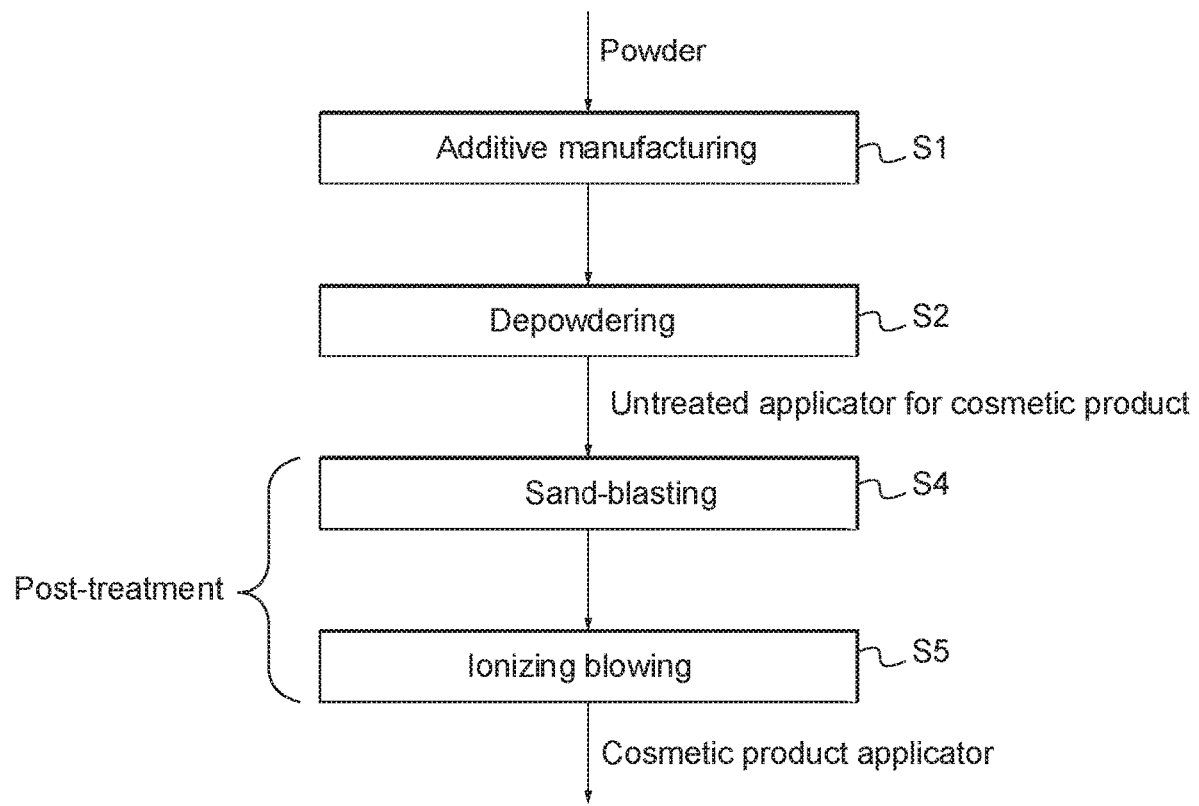
FIG. 1 represents, in block diagram form, a method in accordance with an embodiment of the invention.

The manufacturing method presented in FIG. 1 comprises a plurality of parts of a method of manufacturing a cosmetic product applicator that is in accordance with the invention. This method includes additive manufacturing S1, for obtaining an untreated part.

Additive Manufacturing (S1)

The additive manufacturing S1 is carried out based on a powder, in particular a powder of a plastic material. The additive manufacturing method employed is advantageously a method of powder bed fusion, powder binding, also called "selective laser sintering".

A powder bed fusion method consists of producing objects from materials in powder form using one or more lasers in order to selectively melt the particles of powder at the surface of the powder bed, layer after layer, in a closed chamber. The type of powder used may be of any type of powder able to be used in such a method.

The powder employed may in particular be a powder of a thermoplastic polymer, or a powder of a polyamide, preferably an aliphatic polyamide, for example polyamide 11, also designated PA11, or of polyacrylamide.

Polyamide 12 or PA12 may also be employed with success, although PA11 preferable to it since it is more supple.

An example of PA11 powder that is particularly suitable is the powder commercialized under the reference "PA1101" by the company EOS Materials.

Preferably, the powder has grains of which the greatest dimension is less than or equal to 150 microns. Preferably, the greatest dimension is less than or equal to 80 microns, or still more preferably, less than or equal to 60 microns.

The machine employed for the additive manufacturing may be a machine commercialized under the designation FORMIGA P110 by the company EOS Materials, or any equivalent machine.

In the manufacturing part of the method, the additive manufacturing machine is first of all loaded with powder.

For example, the manufacturing may be carried out in a tank containing approximately 10 kg of powder (typically for PA11). The manufacturing may be carried out over several levels, for example between two and ten levels, in particular over ten levels.

The formation of untreated parts by laser sintering then begins. According to one embodiment given by way of example, the powder in the tank is kept at 150° C. approximately. The laser or lasers then provide the additional energy required for the localized melting of the powder. For example, a laser of 25 W may be employed with success.

Several passes of the laser may be necessary.

The formation by additive manufacturing of a batch of three to four thousand parts may take approximately fifteen hours under these conditions. At the end of this phase of forming the untreated parts, the group must be cooled. In the example taken above the cooling may last of the order of fifteen hours. The total time of the additive manufacturing may thus be of the order of 30 hours.

In order to avoid oxidation, the cooling is advantageously carried out under a neutral gas, for example under argon.

In order to be able to optimize the cycle times, and more simply the time of use of the additive manufacturing machine for the formation of untreated parts, the cooling may be carried out outside the machine, with placing under a neutral gas (in particular under argon) of the content of the tank.

The additive manufacturing S1 is carried out in a machine which uses a digital file geometrically representing the cosmetic product applicator. The file is obtained after having designed the applicator on a computer-aided design (CAD) software application. This file may be in STL format or any other standard file format which may be used for additive manufacture by powder bed fusion. The file is then processed by a software application supplied by the manufacturer of the machine used for the additive manufacture. This software cuts the file into sections in the form of digital images (for example a hundred images) for example in SU or BFF format, each of them corresponding to a layer of the model to print, that is to say a cross-section of the applicator taken in a plane perpendicular to its longitudinal axis. These data are then sent to the additive manufacturing machine in order for it to produce the applicator.

The additive manufacturing thus results in the formation of untreated parts, namely untreated applicators for cosmetic product, buried in the powder and clogged with powder.

It is to be noted in this connection that the applicant has found that not only was it necessary to separate the untreated applicators for cosmetic products so obtained from the powder, but that it was also important, in particular for applicators for the application of a cosmetic product near the eyes, to guarantee the total absence of grains detached from the applicator (for example retained in its bristles) or liable to detach on use, and of which the greatest dimension is above a given size, liable to give rise to ocular irritation. The post-treatment described below is directed to the total elimination of these grains. Typically, the post-treatment aims at eliminating all the particles greater than 500 microns. As a matter of fact, particles of dimensions greater than the dimensions of the initial grains of powder may be generated at the time of the additive manufacturing, for example in case of incomplete sintering of certain grains.

Depowdering (S2)

The additive manufacturing S1 is followed by depowdering S2. This makes it possible to separate the untreated parts from the powder.

The recovered powder may be re-used, as described below with reference to FIG. 2. To that end, the recovered powder may undergo a sorting method in order to keep only the grains of which the greatest dimension is less than or equal to a given size (for example 150 microns, 80 microns or 60 microns).

The depowdering consists of separating the untreated parts from the powder in which they are buried, and of eliminating a maximum of powder carried by the untreated part (for example in the nooks of the untreated part, in the bristles of an untreated part of the cosmetic product applicator). This depowdering may be carried out manually. By manually is meant that an operator must grasp the untreated parts, individually or in groups, and remove the powder therefrom by stirring, blowing, and/or brushing.

The depowdering may be carried out automatically, which is advantageous for the production of parts, in particular small parts of complex shapes such as the cosmetic product applicators, at an industrial scale.

Preferably, this operation is carried out in a depowdering cabin, in order to ensure production at an industrial scale, that is to say more than 200 000 parts per week.

Manual depowdering and all the more so automated depowdering, may nevertheless leave residual powder, this rendering all the more important the post-treatment of the untreated parts, that is to say the untreated applicators for cosmetic product obtained after the depowdering.

As a matter of fact, the applicant has found that for the production of applicators of cosmetic products, in particular for the application of a cosmetic product near the eyes, not only was it necessary to separate the untreated applicators for cosmetic products so obtained from the powder, but that it was also important to guarantee the total absence of grains detached from the applicator (for example retained in its bristles) or liable to detach on use, and of which the greatest dimension is above a given size, liable to give rise to ocular irritation. The following post-treatment is directed to the total elimination of these grains. Typically, the post-treatment aims at eliminating all the particles greater than 500 microns. As a matter of fact, particles of dimensions greater than the dimensions of the initial grains of powder may be generated at the time of the additive manufacturing, for example in case of incomplete sintering of certain grains.

Sand-Blasting (S4)

Sand-blasting is a known technique for cleaning a surface, which uses an abrasive projected at high speed using a compressed gas (generally air) by a nozzle onto the surface to clean.

Nevertheless, the sand-blasting of cosmetic product applicators requires the implementation of optimized parameters on account of the small size of the applicators, of the requirement to sand-blast extremely fine members (namely the bristles of the applicators) without destroying them, of the advantage of sand-blasting a large quantity of parts at the same time (for example from 300 to 10 000 parts), and of the importance of detaching from the untreated parts, by sand-blasting, all the particles liable to detach on use of the applicator.

Pre-blowing S3 can precede the sand-blasting S4, and will be detailed with reference to FIG. 2.

The sand-blasting S4 makes it possible to eliminate the partially sintered grains of powder in particular. The sand-blasting is carried out in a sand-blaster comprising at least one nozzle projecting glass spheres having a diameter from 45 to 90 microns. The sand-blasting also makes it possible to obtain the desired surface state on the cosmetic product applicators. Other abrasive media may be envisioned for example bicarbonate, or compressed fruit pits.

In addition to the nature and the size of abrasive particles, the type of sand-blasting machine, the injection pressure, the distance and the orientation of the nozzle in relation to the surface of the barrel, are important parameters to obtain the desired results.

For the treatment of a large batch of applicators (for example of the order of 3000 to 4000 parts) the following parameters have been determined with success. The sand-blasting is carried out in a sand-blaster with a rotary barrel. The barrel chosen has a diameter of 500 mm. The barrel turns at 3 revolutions per minute to ensure the stirring of the parts. The sand-blasting may last 35 to 45 minutes, for example 40 minutes. The spheres are injected under an air pressure of 2.5 bars.

The person skilled in the art will of course understand that the invention is not limited to these aforementioned parameters, given by way of example.

The stirring may be improved by the use of a second nozzle, blowing laterally into the barrel and/or raising the parts relative to the surface of the barrel.

Ionizing Blowing (S5)

The method comprises, after the sand-blasting S4, ionizing blowing S5. As a matter of fact, the sand-blasting may leave particles lodged in the bristles or other interstices of the cosmetic product applicator. The particles are primarily particles of the material constituting the cosmetic product applicator, for example PA11, but may also be abrasive particles employed for the sand-blasting S4.

Ionizing in general terms consists of removing or adding charges to an atom or molecule. Thus, the ionizing systems commonly called ionizers, produce ions which are charged atoms. The ionizers take different forms. The most frequent form is that of a bar. The ionizing bar must be located near the medium to ionize, typically less than 50 mm. The applicant has identified that the implementation of ionizing blowing is particularly relevant in a method of additive manufacturing of a cosmetic product applicator. As a matter of fact, in cleaning by ionizing blowing, the ionizing makes it possible to eliminate the effects of static electricity carried by the cosmetic product applicator. The stream of air from the blowing makes it possible to separate the residual particles from the applicator, at the surface of which they are no longer retained by static electricity. The particles thus separated from the applicator are sucked out of the ionizing blowing chamber.

The ionizing blowing may be carried out in a barrel or drum identical to the sand-blasting barrel, or even in the same barrel as that used for the sand-blasting S4. The barrel may thus have the dimensional features and rotational speed mentioned for the sand-blasting S4.

For the ionizing blowing S5, the device advantageously comprises two ionizing systems, for example two ionizing bars. One bar is positioned inside the barrel (or other chamber) and one bar is disposed outside.

The following blowing parameters may be employed with success. The ionizing blowing may be carried out under a pressure of 4 bars. The ionizing blowing S5 may last 30 to 40 minutes.

The ionizing blowing S5 may be carried out by batches of 300 to 10 000 parts for example, in particular from 3000 to 4000 cosmetic product applicators.

Naturally, parameters that are close may be employed with success. For example and in non-limiting manner, the blowing pressure may be from 3 to 5 bars, the duration of blowing may be significantly reduced, and for example be of the order of 15 minutes or less.

Further to the ionizing blowing, cosmetic product applicators may be obtained not presenting the drawbacks known in the state of the art (unsatisfactory surface state, potential presence of particles that are irritant for the eye).

Figure 2:
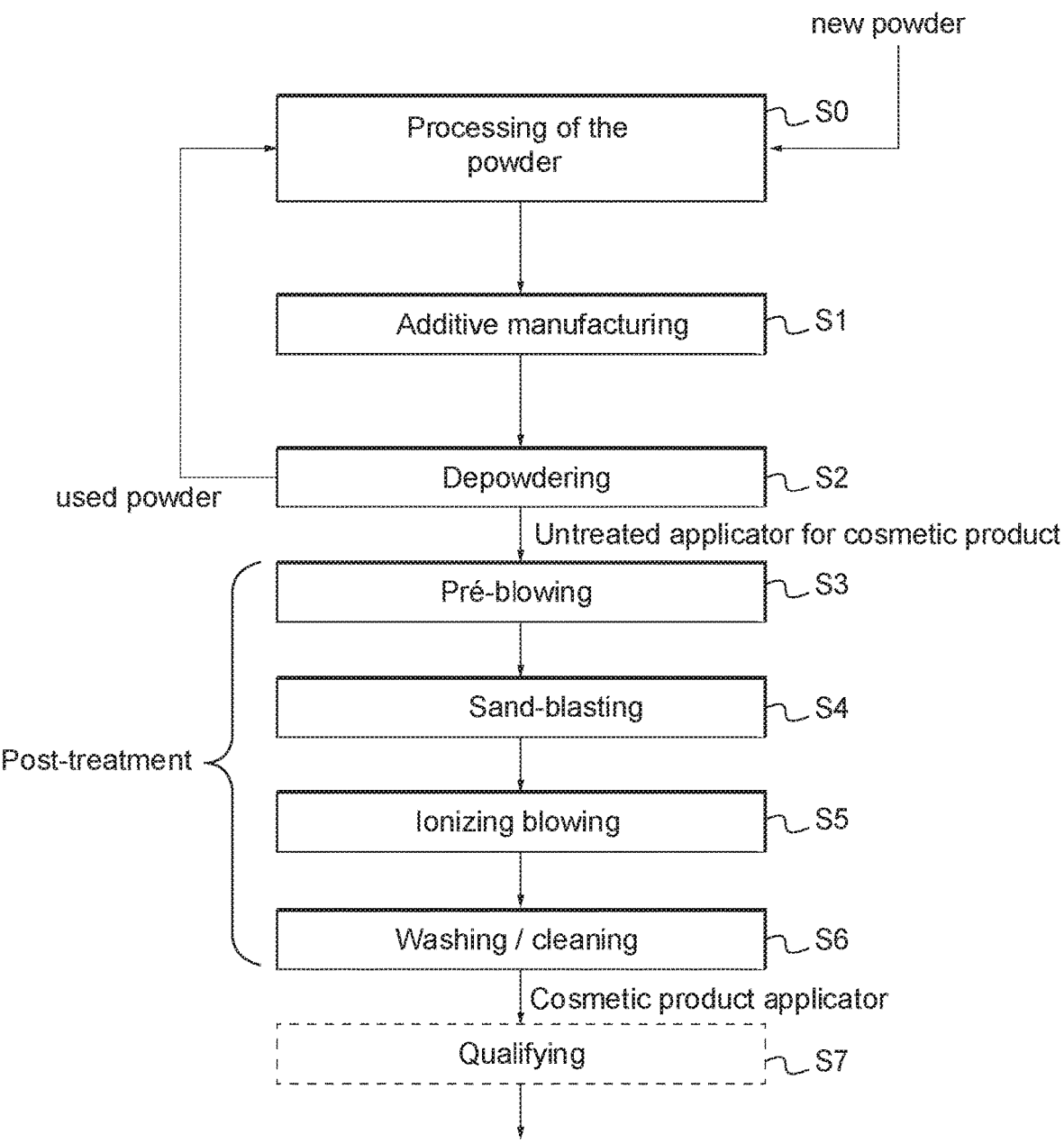
FIG. 2 is a block diagram representing a method in accordance with an embodiment of the invention comprising the method of FIG. 1 and optional additional method parts.

In a manner analogous to FIG. 1, FIG. 2 presents a method of manufacturing a cosmetic product applicator, this method being in accordance with an embodiment of the invention comprising the method of FIG. 1 and additional steps. The additional steps presented below concern a prior step of preparing or processing the powder before the additive manufacturing step (step S0 of processing the powder), and furthermore concern post-treatment steps making it possible to guarantee with even greater certainty that the applicator obtained further to the method has the desired characteristics, in particular the absence of particles that are detached or liable to detach on use.

The optional steps described below can vary the optimum parameters for performing the other steps, but they may be incorporated independently of each other in the method of FIG. 1.

Processing of the Powder (S0)

In order to obtain the desired final surface state, it is important for the powder employed for the additive manufacturing S1, for example of PA 11 or PA 12, to have suitable characteristics at the outset.

The characteristic which appears to be the most important is the particle size of the powder employed.

Typically, the applicant has noted the importance of employing a fine and homogenous powder to avoid the defects on the cosmetic product applicator as a final product of the method. The powder employed must advantageously only have grains of which the greatest dimension is less than 150 microns. Advantageously, a still finer powder may be employed, namely of which the greatest dimension of the grains is less than 80 microns or 60 microns.

The desired characteristics, in particular the particle size, may be guaranteed by selecting a commercially available powder having these characteristics. Nevertheless, for obvious reasons of cost, it is advantageous to be able to re-use the powder referred to as used, that is to say having already been employed at additive manufacturing S1. In particular, a certain portion of the powder recovered at the depowdering S2 may be re-used for a following cycle (or batch) of manufacturing cosmetic product applicators.

The used powder may have been altered, compared with the new powder, at the time of the additive manufacturing, even if this powder is not linked to the untreated part. The grains of powder may have been deformed by heat, be bonded or partially sintered.

In order for the used powder to be re-used without compromising the characteristics of the final product, the recovered used powder is calibrated by a suitable sorting or calibration method. In particular screening of the used powder may be carried out. Several types of screening may be envisioned in order to separate, from the recovered powder, the grains having a dimension greater than the maximum dimension desired. It is in particular possible to use screening by ultrasound, by micro-vibration and/or by blowing.

The desired maximum dimension of the greatest dimension of the grains may for example be 150 microns, or 80 microns, or 60 microns.

The sorting or screening enables the recovery of calibrated used powder, which is suited to re-use for the additive manufacturing of cosmetic product applicators.

In the processing of the powder S0, a mixture of new powder and calibrated used powder is thus carried out. It is sought to re-use the used powder to the maximum. Satisfactory results have been obtained, with a PA 11 powder, with a new powder/used powder ratio comprised between 100/0 and 50/50, in particular comprised between 70/30 and 50/50, for example of the order of 60/40.

Pre-Blowing (S3)

The pre-blowing S3 is carried out after the depowdering S2 and before the sand-blasting S4.

The pre-blowing is directed to removing a maximum of particles further to the depowdering by subjecting the untreated depowdered parts to a stream of air under pressure. The pre-blowing may advantageously be carried out in the barrel of the sand-blasting machine which will be used for the sand-blasting S4. The pre-blowing may be carried out for 5 to 10 minutes, for example 7 minutes, with two nozzles blowing air at 2.5 bars.

Washing/Cleaning (S6)

Complementary cleaning may be carried out during what is referred to as washing or cleaning S6.

By cleaning is meant any type of action enabling an elimination of the grains, particles or other residual matter from the surface of the cosmetic product applicators, or from the bristles or interstices of the those parts. The washing corresponds to a type of cleaning implementing a washing product, whether or not aqueous.

Washing in an appropriate solution may be carried out. The washing may be carried out based on a principle of washing by reflux.

The washing device employed may comprise several sections, for example:
a washing tank called boiler;
a rinsing tank;
an evaporation zone;
a drying zone; and
a condensing coil at 4° C. making it possible to collect and recycle the washing product.

The washing tank may comprise a rotating basket comprising mesh, and/or immersed jets.

In the washing and/or rinsing tanks, the parts may be subjected to ultrasound. The ultrasound used may have a frequency comprised between 25 kHz and 45 kHz.

The washing may in particular be carried out in a 50% solution of isopropyl alcohol or preferably in a fluoroketone solution. This solution has a good level of effectiveness in the elimination of the residual sand-blasting spheres, and more generally in the elimination of the particles of dimensions less than 80 microns, without altering the mechanical properties of the cosmetic product applicators.

Additionally or alternatively, screening of the cosmetic product applicators may be envisioned to screen the parts under micro-vibration and/or blowing. This also has the advantage of being carried out in a dry environment.

Qualifying (S7)

A qualifying S7 can make it possible to ensure that the cosmetic product applicators obtained at the end of the actual manufacturing method meet certain qualitative criteria.

In particular, the qualifying can make it possible to ensure the absence of potentially irritant particles in the finished products.

The qualifying may be carried out periodically during the production, at regular or random intervals, or more preferably by random sampling of a specific number of cosmetic product applicators in each batch of parts. A batch may for example be constituted by a group of 10 000 to 100 000 parts, and 8 to 100 parts may be sampled from each batch.

During the qualifying, it can be checked that none of the sampled parts includes particles that are detached or liable to detach on use, of which the greatest dimension is greater than 500 microns (or greater than another predefined dimension).

The number of particles that are detached or liable to detach on use, of smaller dimension, may also be checked. For example, it is possible to check the number of particles of which the largest dimension is comprised between 150 microns and 500 microns. For example, the qualifying may enable a predefined maximum number of such particles (not critical for the consumer) for a given quantity of applicators to be present (for example 7 particles for a sample of 32 applicators in a batch of 10 000 to 100 000 parts or for instance 10 particles for a sample of 50 parts of a group of more than 500 000 parts).

In case of non-compliance detected at the qualifying, the batch concerned may be rejected or destroyed. Measures for checking the method and/or for correcting the manufacturing parameters may be taken.

The invention thus provides a method of manufacturing at industrial scale, by additive manufacturing, of a cosmetic product applicator comprising a grip part and an application part. This manufacturing method guarantees the absence of particles that are detached or liable to detach in particular from the application part, which may comprise bristles or teeth for retaining cosmetic product. This is important for applicators of mascara brush type, or more generally for applicators for the application of a cosmetic product near the eyes. The method thus guarantees the absence of particles of dimensions greater than a given dimension (for example 500 microns). The method can also make it possible to guarantee a maximum number of particles in certain ranges of dimensions (for example between 150 microns and 500 microns).

The manufacturing method provided in the invention enables this by considering the manufacturing as a succession of steps not being limited to additive manufacture, but comprising pre-treatment or processing of the material employed, as well as suitable post-treatment steps.

The invention claimed is:

1. Method of manufacturing a one-piece cosmetic product applicator having a grip part and an application part, the application part having bristles or teeth, said method comprising;
    additive manufacturing (S1) by sintering of a powder of plastic material; and
    following the additive manufacturing (S1):
        depowdering (S2); and
        post-treatment that eliminates particles that are detached from said cosmetic product applicator or that are partially sintered, the post-treatment comprising:
            sand-blasting (S4); and
            ionizing blowing (S5).

2. Manufacturing method according to claim 1, wherein: the post-treatment further comprises a final method part of washing (S6).

3. Manufacturing method according to claim 1, wherein: the post-treatment further comprises a final method part of washing (S6) in a non-aqueous solvent.

4. Manufacturing method according to claim 1, wherein: the plastic material is a polyamide.

5. Manufacturing method according to claim 1, wherein: the plastic material is an aliphatic polyamide.

6. Manufacturing method according to claim 1 wherein: the plastic material is an aliphatic polyamide in the form of polyamide 11.

7. Manufacturing method according to claim 4, further comprising, prior to the additive manufacturing (S1):
    processing of the polyamide powder (S0) comprising:
        providing new powder having only grains of which a greatest dimension is less than or equal to 150 microns;
        providing so-called used powder having already served for additive manufacturing method part, and the calibration of said used powder in order for it to have only grains of which a greatest dimension is less than or equal to 150 microns; and
        mixing the new powder and the calibrated used powder in a new powder/used powder ratio comprised between 70/30 and 50/50.

8. Manufacturing method according to claim 7, wherein: the powder/used power ratio is on the order of 60/40.

9. Manufacturing method according to claim 1, wherein: the additive manufacturing (S1) comprises powder bed fusion by laser.

10. Manufacturing method according to claim 1, further comprising:
    a pre-blowing method part (S3) prior to the sand-blasting.

11. Manufacturing method according to claim 1, wherein: the sand-blasting is carried out by microsphere treatment with glass spheres of a diameter comprised between 45 microns and 90 microns.

12. Manufacturing method according to claim 1, wherein: the sand-blasting (S4) is carried out in a rotary drum comprising two sand-blasting nozzles.

13. Manufacturing method according to claim 1, wherein: the ionizing blowing (S5) is carried out in a rotary drum comprising an internal ionizing bar and an external ionizing bar.

14. Manufacturing method according to claim 1, wherein: the sand-blasting (S4) and the ionizing blowing (S5) are carried out in batches of 300 to 10 000 cosmetic product applicators.

15. Method of producing cosmetic product applicators comprising a manufacturing method according to claim 12, further comprising:
    at least one qualifying method part (S7) comprising determining, in a batch of a predetermined number of cosmetic product applicators, a number of residual particles that are detached or partially sintered of a largest dimension greater than 500 microns, and, if said number of particles is not zero, modifying at least one parameter of a post-treatment, then performing a succession of manufacturing methods and qualifying method parts (S7) until said number of particles of largest dimension greater than 500 microns is zero.

* * * * *